W. G. WARDEN.
APPARATUS FOR DISTILLING PETROLEUM AND OTHER LIQUIDS.
No. 112,751. Patented Mar. 14, 1871
FIG. 1.
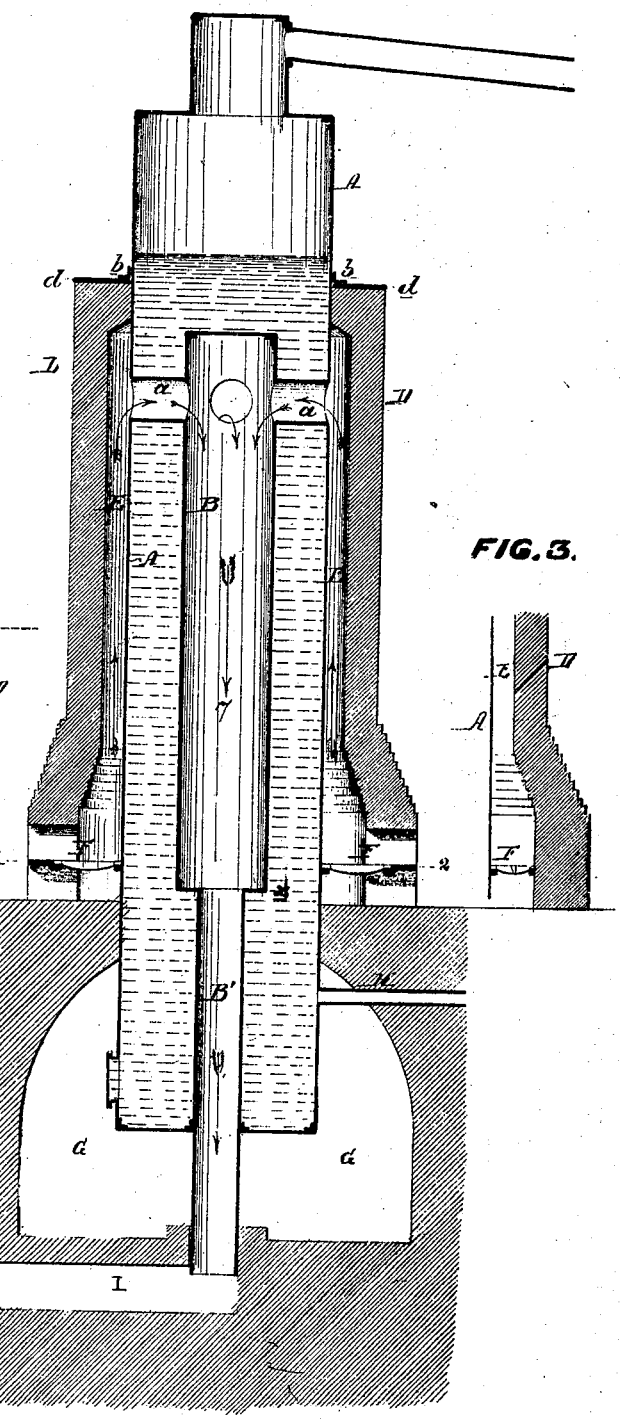
FIG. 2.
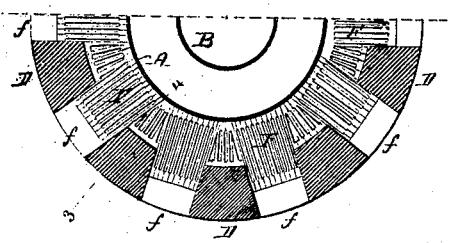
FIG. 3.
Witnesses.

United States Patent Office.

WILLIAM GRAY WARDEN, OF PHILADELPHIA, PENNSYLVANIA.

Letters Patent No. 112,751, dated March 14, 1871.

IMPROVEMENT IN APPARATUS FOR DISTILLING PETROLEUM AND OTHER LIQUIDS.

The Schedule referred to in these Letters Patent and making part of the same.

I, WILLIAM GRAY WARDEN, of Philadelphia, county of Philadelphia, State of Pennsylvania, have invented an Apparatus for Vaporizing Liquids, of which the following is a specification.

Nature and Object of the Invention.

My invention consists of a still or boiler combined with certain flues and with a fire-place in a manner too fully described hereafter to need preliminary explanation, the object of my invention being to obtain in a boiler or still of simple construction an extended heating-surface.

Description of the Accompanying Drawing.

Figure 1 is a vertical section of my improved still or boiler;

Figure 2, a sectional plan on the line 1–2, fig. 1 and

Figure 3, a vertical section on the line 3–4, fig. 2.

General Description.

A is a vertical cylindrical vessel of plate-iron, containing an internal flue, B, which is reduced in diameter at $x$, and passes thence through the bottom of the vessel, as shown in fig. 1.

The internal flue B is closed at the top, immediately below which it is connected to the outer vessel by any desired number of horizontal tubes, $a\ a$.

A flange, $b$, is secured to the vessel, and this flange bears on a plate, $d$, resting on the top of the brick structure D, inclosing the greater portion of the vessel, between which and the brick-work intervenes an annular flue, E.

The fire-place F extends uninterruptedly entirely round the vessel, as shown in the sectional plan, fig. 2; in other words, the fire-place is annular, communicates directly with the flue E, and has any desired number of openings, $f$, (ten in the present instance,) provided with suitable doors, the grate at the opening being somewhat longer than the grate between the doors.

Beneath the brick structure is an arched chamber, G, into which the lower portion of the vessel projects, as shown in fig. 1, and with this projecting portion communicates a pipe, H, which, in case of a steam-boiler, may represent a feed-pipe, and if the vessel be used as a still, it may represent the pipe through which the petroleum or other material to be distilled may be introduced into the vessel.

The vessel may also be furnished at or near its lower end with a blow-off or discharge-pipe, for disposing, from time to time, of such residuum or sediment as may accumulate in the vessel.

The products of combustion from the fire-place circulate freely through the annular flue E, round the vessel, pass through the horizontal tubes $a\ a$, and thence downward through the central flue B and through the contracted portion B' of the same to the flue I, which communicates with any adjacent chimney.

The object of contracting the internal flue of the vessel at $x$ is to permit a slight yielding at that point during the expansion and contraction of the vessel, or of the flue itself. The outer vessel is also at liberty to expand and contract at pleasure without disturbing the brick structure upon which the vessel is suspended, so that when it expands or contracts it will simply move to a limited extent in the arched roof of the chamber G.

It will be seen that there is an extended heating-surface exposed to the action of the fire, the greater portion of the vessel being enveloped by the products of combustion, the heat of which becomes intensified as the products pass into and down through the internal flue of the vessel.

Air may be injected into the flue B, at about fig. 4, through a perforated pipe, to effect more thorough combustion.

Claims.

1. A still or boiler, consisting of a vessel, A, having an internal flue, B, closed at the top, so as to have a downward draught, in combination with a continuous annular flue surrounding the vessel and communicating with the fire-place, and, through tubes $a$, with the said internal flue, all substantially as set forth.

2. The combination of the vessel A, the continuous annular fire-place surrounding the vessel, and the annular flue E, substantially as described.

In testimony whereof I have signed my name to this specification in the presence of two subscribing witnesses.

W. G. WARDEN.

Witnesses:
CHARLES E. FOSTER,
A. H. NORRIS.